Figure 1:
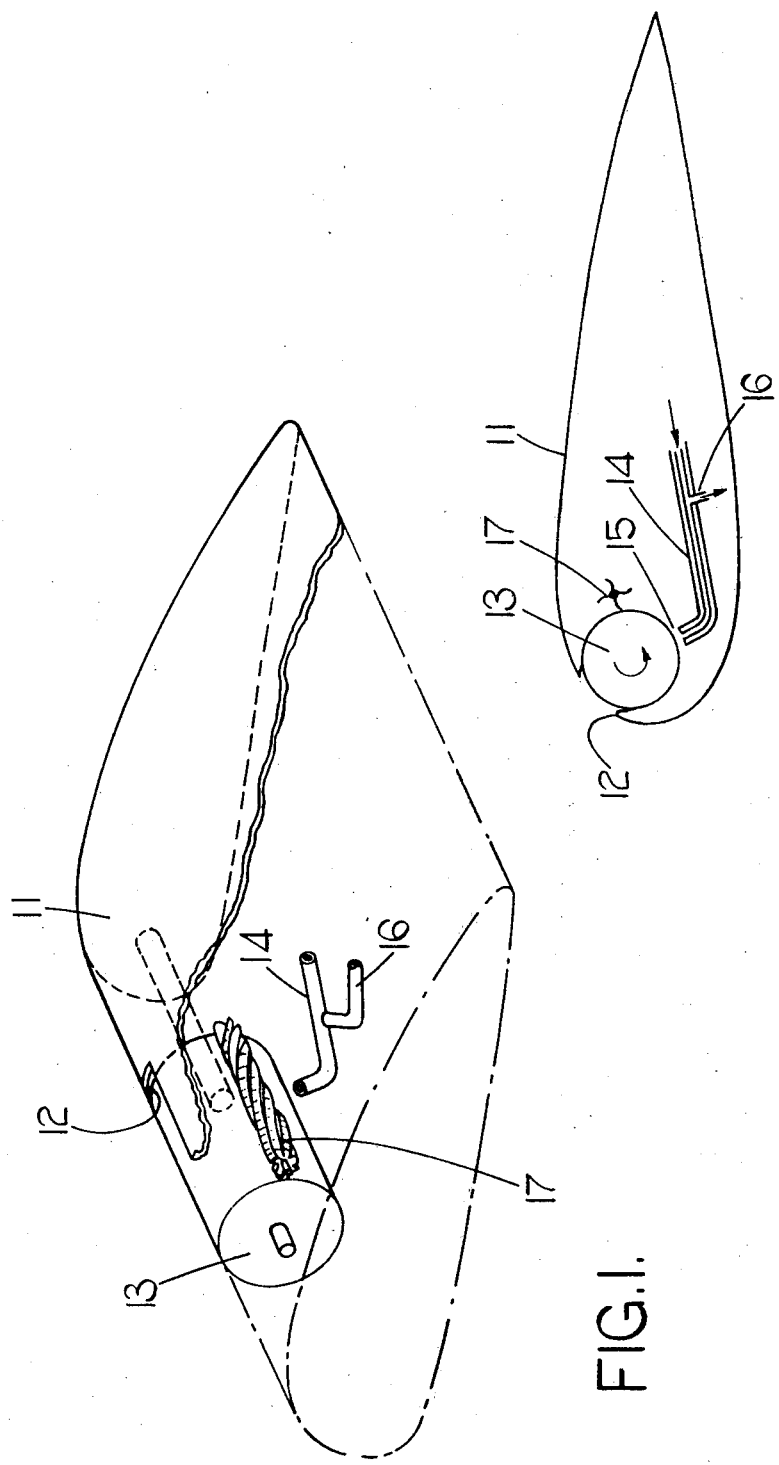

United States Patent [19]

Edgington

[11] 3,996,787
[45] Dec. 14, 1976

[54] APPARATUS FOR INDICATING ICE ACCRETION

[75] Inventor: Geoffrey Edgington, Godalming, England

[73] Assignee: Lucas Industries Limited, Birmingham, England

[22] Filed: July 7, 1975

[21] Appl. No.: 593,485

[30] Foreign Application Priority Data

July 9, 1974 United Kingdom ............ 30317/74

[52] U.S. Cl. .............................. 73/37.6; 73/178 R; 244/134 F
[51] Int. Cl.² ................. G01B 13/04; G01C 21/00
[58] Field of Search ............. 73/178 R, 17 R, 37.7, 73/37.6, 170 R; 244/134 F

[56] References Cited

UNITED STATES PATENTS

| 2,171,450 | 8/1939 | Langley | 244/134 F |
| 2,427,778 | 9/1947 | Gregg | 244/134 F |

Primary Examiner—Donald O. Woodiel
Attorney, Agent, or Firm—Kane, Dalsimer, Kane, Sullivan and Kurucz

[57] ABSTRACT

Apparatus for indicating rate of ice accretion includes an endless test surface upon which ice forms in use. A gas flow passage terminates adjacent the surface in an aperture which is presented to and spaced by a known gap from the test surface. A flow of gas is generated in the passage towards the aperture and a drive arrangement drives the test surface past the aperture at a constant rate. An ice removal device is operable to remove ice from the test surface after the surface has moved past the aperture and there is provided a sensor which detects variations in the flow and/or pressure of the gas in the passage. These variations arise from the effect on gas flow of restriction of the gas by ice forming on the surface, and associated with the sensor is an instrument which provides an indication of the extent of the variation in flow and/or pressure and accordingly provides an indication of the rate at which ice is being accreted on the test surface.

9 Claims, 3 Drawing Figures

U.S. Patent  Dec. 14, 1976  Sheet 1 of 2  3,996,787

APPARATUS FOR INDICATING ICE ACCRETION

This invention relates to apparatus for indicating rate of accretion of ice, and is particularly intended for use in aircraft.

Apparatus according to the invention includes a test surface upon which ice forms in use, passage means terminating adjacent said surface in an aperture which is presented to, and spaced by a known gap from, said surface, means for generating the flow of gas in said passage means towards said aperture, a drive arrangement driving said test surface past said aperture at a known speed, an ice removal device operable to remove ice from the test surface after the surface has moved past said aperture, a sensor detecting variations in the flow and/or pressure of gas in said passage means arising from the effect on the gas flow of restriction of said gap by ice on said surface, and an instrument associated with said sensor, said instrument providing an indication of the extent of the variation, and accordingly providing an indication of the rate at which ice is being accreted on the test surface.

Conveniently said means for generating a gas flow is arranged to produce a constant gas flow.

Alternatively said passage means includes a restrictor and said means for generating a gas flow is arranged to produce a gas flow at constant pressure upstream of the restrictor, said sensor communicating with said passage means between said aperture and said restrictor.

Preferably, the apparatus includes a second, reference aperture supplied with gas from the same source as said first mentioned aperture, said sensor comparing changes in flow and/or pressure upstream of both the first mentioned aperture and the reference aperture and so negating the effects of any fluctuation in flow, or pressure of gas from said source.

Conveniently, said reference aperture is presented to, and spaced by a known fixed gap from said test surface, but the opposite side of said ice removal device from the first mentioned aperture so that any change in said test surface, for example as a result of an ice film not being removed by said ice removal device, is accommodated.

Conveniently, said test surface is the surface of a circular cylinder, said cylinder being rotated about its axis by said drive arrangement.

Alternatively the test surface is the surface of a loop of material in sheet, ribbon, or wire form.

As a further alternative the test surface can be the surface of a reciprocable member movable between an ice accretion position and an ice removal position.

Figure 2:
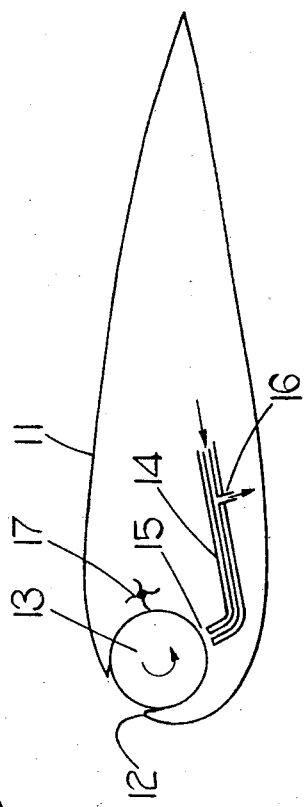
Figure 3:
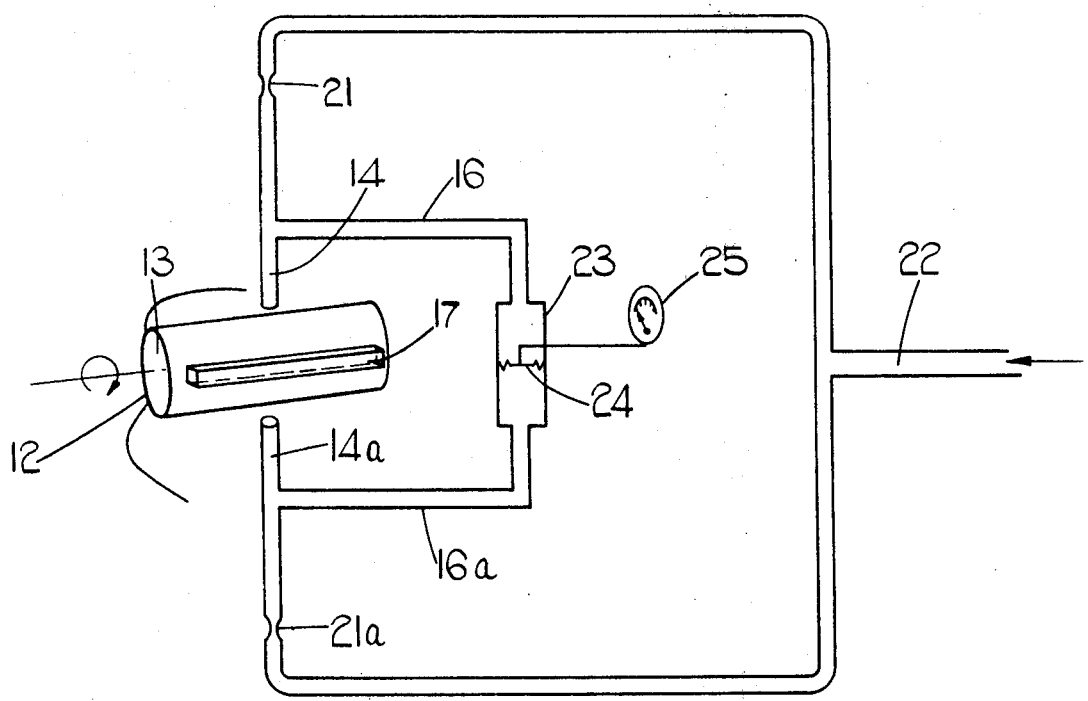

Desirably, said ice removal device is a scraper. One example of the invention is illustrated in the accompanying drawings wherein, FIG. 1 is a diagrammatic perspective representation of part of an apparatus for indicating ice accretion, for use in an aircraft, FIG. 2 is a diagrammatic side elevational view of the apparatus shown in FIG. 1, and FIG. 3 is a diagrammatic representation of a modification of the apparatus shown in FIGS. 1 and 2. Referring first to FIGS. 1 and 2 of the drawings, the apparatus for indicating rate of ice accretion comprises a small wing-like nacelle 11 of airfoil cross-section. The nacelle protrudes from the fuselage of the aircraft, and is positioned such that conditions at the leading edge of the nacelle 11 will be related to conditions at the leading edges of the wings of the aircraft, or to conditions at other predetermined areas of the aircraft. The leading edge of the nacelle 11 is formed with an aperture 12 within which is exposed part of the surface of a cylinder 13. The cylinder 13 is of circular cross-section, and is rotatable about its longitudinal axis at a predetermined constant rate by a drive arrangement (not shown). The surface of the cylinder 13 constitutes an endless surface and rotation of the cylinder causes the cylindrical surface continually to be exposed to the airflow over the leading edge of the nacelle 11 when the aircraft is in flight. Thus the surface of the cylinder 13 will, in flight, be subject to atmospheric conditions related to those at, for example, the leading edges of the aircraft wings. If the atmospheric conditions are such that ice would form on the wings, then ice will form similarly, and at a related rate on the surface of the cylinder 13 exposed through the aperture 12.

Within the nacelle 11 there is a gas conduit 14 terminating at its end adjacent to the cylinder 13 in an aperture presented to the cylindrical surface of the cylinder 13. The aperture presented to the surface of the cylinder 13 is spaced from the axis of rotation of the cylider 13 by a predetermined distance so that there is a constant gap 15 between the surface of the cylinder 13 and the aperture. At its end remote from the cylinder 13 the gas conduit 14 communicates with a source of dry air of other gas, the source being arranged so that there is a constant rate of flow of gas along the conduit 14. During use of the apparatus the cylinder 13 rotates at a constant speed and gas issues from the aperture at the end of the conduit 14 at a constant rate of flow. The gas pressure within the conduit 14 as represented by the signals produced by the pressure sensor coupled to the branch pipe 16 will be constant provided that the gap 13 does not alter. However, should icing occur then a film of ice will buildup on the exposed surface of the cylinder 13 and as the cylinder 13 rotates the film of ice will pass between the surface of the cylinder and the aperture at the end of the conduit 14 thereby restricting the gap 15 and resulting in an increase in gas pressure in the conduit 14. This increase in gas pressure is monitored by the pressure sensor.

It will be understood that ice formation on the surface of the cylinder 13 takes place on that region of the surface exposed in the aperture 12. Thereafter, the iced part of the surface passes into the nacelle, and past the aperture of the conduit 14. Thereafter, a mechanical scraper 17 engaging or close to the surface of the cylinder removes any ice which is on the surface of the cylinder, so that the surface is free of ice when it is once again exposed in the aperture 12. The scraper can take a number of different forms, and in the arrangement shown is a rotating cutter. However, the scraper can be fixed scraping blade, and other ice removal devices are possible, for example localized heating devices could be used.

It is to be understood that in many cases it is extremely desirable to known the rate at which ice is forming, rather than merely to have the knowledge that ice is present on the airfoil surfaces of the wings, and more particularly the engine air intake passages which will be similarly subject to icing. It will be understood that the greater the thickness of ice film on the surface then the greater the restriction of the gap 15, and the greater the pressure change in the conduit 14. Moreover, since the test surface rotates at a known, constant rate, and ice is removed from the surface after it passes the aperture, then the pressure in said branch pipe 16 is in effect a measure of the rate of ice accretion. Thus, in its simplest aspect the rate of ice accretion can be indicated merely by connecting the branch pipe to a pressure sensor in the form of a pressure gauge. The pressure gauge will be set to give a zero reading when the gap 15 is unrestricted, and thereafter, as the gap becomes restricted and the pressure in the branch pipe 15 increases then the visual reading of the pressure gauge is a measure of the rate at which ice is being accreted on the cylindrical test surface, the higher the pressure reading, the greater the thickness of ice on the test surface, and therefore the greater the rate of ice accretion.

In the arrangement described above, the conduit 14 carries gas at a constant rate of flow. However, in a modification the source of dry air, or gas maintains a constant pressure upstream of a restrictor in the conduit 14, the branch pipe 16 is between the restrictor and the aperture, and once again the gas pressure within the conduit, between the restrictor and the aperture will vary in accordance with restriction of the gap 15. However, the relationship between restriction of the gap, and variation in pressure will not be the same relationship as in the constant flow arrangements described above. Nevertheless, a relatively simple pressure gauge connected to the branch pipe 16 will still indicate the rate of ice accretion, but the gauge will be calibrated in a manner different to that of the gauge in the constant flow arrangement.

The arrangements described with reference to FIGS. 1 and 2 which require either constant flow, or constant pressure in the conduit 14 might prove impractical for aircraft use, where the expense, and weight of the appratus necessary to produce constant flow, or constant pressure could prove prohibitive. In the modification shown in FIG. 3 there is shown an arrangement which will operate satisfactorily from the normal pressure supply of the aircraft. The arrangement is basically similar to the arrangements in FIGS. 1 and 2 in that again it includes a rotating cylinder 13, part of the surface of which passes through an aperture 12 into which the ambient airflow passes. A cutter 17 is operable to remove ice from the surface of the cylinder 13, and a conduit 14 terminating in an aperture presented to the surface of the cylinder 13 is positioned between the aperture 12 and the cutter 17 so that ice forming on the surface of the cylinder 13 passes adjacent the aperture at the end of the conduit 14 before being removed by the cutter 17. A similar conduit 14a terminating in a similar aperture is positioned on the opposite side of the cylinder 13 from the conduit 14 so that the surface of the cylinder 13 passes the aperture at the end of the conduit 14a after passing the cutter 17. In series with the aperture of the conduit 14 is restrictor 21 and a similar restrictor 21a is provided in the conduit 14a. The conduits 14, 14a are both connected to a common supply conduit 22 which in turn receives a supply of dry air from the conventional compressed air system of the aircraft. The flow of dry air in the conduit 22 is divided between the conduits 14 and 14a. The aperture of the conduits 14, 14a are presented to the surface of the cylinder 13, and are spaced therefrom by a fixed, known distance. Intermediate the aperture of the conduits 14, 14a and their respective restrictors 21, 21a there are provided respective branch pipes 16, 16a terminating at a chamber 23 divided internally by a diaphragm 24. The pressure conditions in the branch pipe 16a thus act on one face of the diaphragm 24 while the pressure conditions in the branch pipe 16 act on the other face of the diaphragm 24. The diaphragm 24 is coupled in any convenient manner, either mechanically or electrically to a gauge 25, the needle of which reflects the position of the diaphragm 24 relative to the walls of the chamber 23.

In the event that no ice forms on the surface of the cylinder 13 then the apertures of the conduits 14, 14a will both be unrestricted, and the pressure conditions in the branch pipes 16, 16a will be identical. Thus the diaphragm will occupy a rest position reflected by the gauge 25 reading zero. As ice builds-up on the surface of the cylinder 13 the aperture of the conduit 14 will be restricted, and the pressure in the branch pipe 16 will increase. However, the ice restricting the aperture of the conduit 14 will be removed by the cutter 17 before it reaches the aperture of the conduit 14a and so the conduit 14a will remain unrestricted. Thus, the diaphragm will be moved by the increase in the pressure in the branch pipe 16 and the movement will be reflected by movement of the needle of the gauge 25. The pressure in the pipe 16 will again be a measure of the rate at which ice is forming and thus the greater the reading on the gauge 25, then the greater is the rate of ice accretion. It will be appreciated therefore, that the aperture of the conduit 14a constitutes a reference aperture, and the use of the reference aperture negates at least when no ice is present the effect of any fluctuations in the pressure supply in the conduit 22. Total negation is of course only true at zero ice conditions and the actual effect of supply fluctuation will increase as the thickness of ice accreted increases. Similarly, should the cutter 17 not remove all of the ice forming on the surface 13 then the film of ice remaining will of course return past the aperture of the conduit 14. In the previous examples such an occurrence would result in a false reading. However, in the arrangement shown in FIG. 3 no such false reading occurs since the film of ice remaining after the surface passes the cutter 17 will restrict the aperture of the conduit 14a, thereby providing a balancing effect at the diaphragm 24 to accommodate the effect of the unremoved ice on the aperture of the conduit 14.

It will be understood that since air is issuing from both conduits onto the surface of the cylinder 13 then the likelihood of chips of ice dislodged by the cutter 17 blocking the apertures of the conduits 14, 14a is extremely small. In order to further reduce this likelihood the conduit 14a can if desired be positioned close to the cutter 17 so that the air issuing from the conduit 14a acts as an air blast to clear ice chips from the vicinity of the cylinder 13 immediately they are dislodged by the cutter 17.

It is to be understood that it is not essential that the reference aperture provided by the conduit 14a is positioned adjacent the cylinder 13. It is extremely desirable that such is the case since then the arrangement accommodates an ice film which is not removed by the cutter. However, in a simplified form of the apparatus the reference aperture is provided by a needle valve at the end of the conduit 14a the setting of the needle valve being adjusted to cause the gauge 25 to read zero when no ice is present on the cylindrical surface.

In all of the above described examples of the parameter which is monitored is the pressure, and the variations in pressure. However, it is to be understood that in some of the arrangements described above the parameter monitored could be the rate of flow of air in the conduit or conduits. The rate of flow can be measured in any number of known ways, for example, by using a heated wire in each conduit, and detecting the rate of cooling of the wire, the rate of cooling of course being determined by the rate of flow of air or other gas in the conduit.

Furthermore, while it is to be understood that it is convenient to use the surface of a rotating cylinder as the test surface other arrangements are possible. For example, the test surface could be a flat plate which is rotated past one or more apertures in the manner of the cylinder 13, and alternatively a flexible loop of material in the form of a sheet, ribbon, or wire could be utilized to provide the test surface. Furthermore, a linearly reciprocable plate could be utilized, the plate being reciprocated between an ice removal position and an ice accretion position. In the latter position the plate lies in the airstream and during movement from this position the plate passes before the aperture of the system, the aperture being restricted in accordance with the ice thickness. Thereafter the ice is removed before the plate is returned to the ice accretion position.

I claim:
1. Apparatus for indicating rate of ice accretion including, test surface upon which ice forms in use, passage means terminating adjacent said surface in an aperture which is presented to, and spaced by a known gap from, said surface, means for generating a flow of gas in said passage means towards said aperture, a drive arrangement driving said test surface past said aperture at a known speed, an ice removal device operable to remove ice from the test surface after the surface has moved past said aperture, a sensor detecting variations in one of the flow and pressure of gas in said passage means arising from the effect on the gas flow of restriction of said gap by ice on said surface, and an instrument associated with said sensor, said instrument providing an indication of the extent of the variation, and accordingly providing an indication of the rate at which ice is being accreted on the test surface.

2. Apparatus as claimed in claim 1 wherein said means for generating a gas flow is arranged to produce a constant gas flow.

3. Apparatus as claimed in claim 1 wherein said passage means includes a restrictor and said means for generating a gas flow is arranged to produce a gas flow at constant pressure upstream of the restrictor, said sensor communicating with said passage means between said aperture and said restrictor.

4. Apparatus as claimed in claim 1 wherein there is provided a second, reference aperture supplied with gas from the same source as said first mentioned aperture, said sensor comparing changes in one of the flow and pressure upstream of both the first mentioned aperture and the reference aperture and so reducing the effects of any fluctuation in flow, or pressure of gas from said source.

5. Apparatus as claimed in claim 4 wherein the reference aperture is presented to, and spaced by a known fixed gap from said test surface, but the opposite side of said ice removal device from the first mentioned aperture so that any change in said test surface, for example as a result incomplete removal of an ice film, is accommodated.

6. Apparatus as claimed in claim 1 wherein said test surface is the surface of a circular cylinder, and cylinder being rotated about its axis by said drive arrangement.

7. Apparatus as claimed in claim 1 wherein the test surface is the surface of a loop of material in sheet, ribbon, or wire form.

8. Apparatus as claimed in claim 1 wherein the test surface is the surface of a reciprocable member movable between an ice accretion position and an ice removal position.

9. Apparatus as claimed in claim 1 wherein said ice removal device is a scraper.

* * * * *